United States Patent [19]

Kenik et al.

[11] Patent Number: 4,821,197

[45] Date of Patent: Apr. 11, 1989

[54] APPARATUS AND METHOD FOR PARTS ASSEMBLY

[75] Inventors: Frank W. Kenik, Wadsworth; Ronald J. Jensen, Libertyville, both of Ill.; James J. Bayer, Kenosha, Wis.; David F. Allgeyer; Richard R. McCarthy, both of Antioch, Ill.; Thomas A. Miceli, Zion, Ill.

[73] Assignee: Outboard Marine Corporation, Waukegan, Ill.

[21] Appl. No.: 41,302

[22] Filed: Apr. 22, 1987

[51] Int. Cl.$^4$ .............................................. G06F 15/46
[52] U.S. Cl. ..................................... 364/468; 29/701; 364/478; 414/273
[58] Field of Search ............... 364/468, 478, 479, 403; 235/385, 375; 29/701, 702, 703, 704, 707; 414/273, 274, 289, 331, 134–136; 209/546, 551

[56] References Cited

U.S. PATENT DOCUMENTS

| | | | |
|---|---|---|---|
| 3,532,184 | 6/1968 | Blake | 186/1 |
| 3,716,697 | 2/1973 | Weir | 235/383 |
| 3,739,339 | 6/1973 | Hillhouse et al. | 186/1 |
| 3,770,941 | 11/1973 | Gechele et al. | 235/383 |
| 3,780,906 | 12/1973 | Colburn et al. | 221/2 |
| 3,908,800 | 9/1975 | Drapeau | 186/1 R |
| 4,237,598 | 12/1980 | Williamson | 364/474 X |
| 4,332,012 | 5/1982 | Sekine et al. | 364/468 |
| 4,346,453 | 8/1982 | Drapeau et al. | 364/900 |
| 4,419,734 | 12/1983 | Wolfson et al. | 364/567 |
| 4,521,677 | 6/1985 | Sarwin | 235/385 |
| 4,598,459 | 7/1986 | Klink et al. | 29/703 X |
| 4,625,396 | 12/1986 | Ahmed et al. | 29/701 |
| 4,646,245 | 2/1987 | Prodel et al. | 364/468 |
| 4,669,047 | 5/1987 | Chucta | 364/478 X |

OTHER PUBLICATIONS

"Orderpicking Systems to Boost Productivity", Modern Materials Handling, 1985 Warehouse Guidebook, pp. 56–60.

Primary Examiner—Joseph Ruggiero
Attorney, Agent, or Firm—Welsh & Katz, Ltd.

[57] ABSTRACT

A system for manufacturing multiple component assemblies utilizing semi-automatic computer-assisted material handling. The system comprises a plurality of component selection cells each having an alphanumeric display to display a selected assembly model description and a plurality of component bins wherein each bin has an associated numeric display for displaying the quantity of components from that bin required for a selected assembly model. Each numeric display has a means for clearing the display after the required quantity of components has been selected and for generating a control signal in response to a completion of a selected collection of parts for that cell relating to the selected assembly model. A computer controls the alphanumeric and numeric displays responsive to data entered by an operator relating to the selected assembly model number and controls the clearing of the alphanumeric displays in response to the control signal.

27 Claims, 16 Drawing Sheets

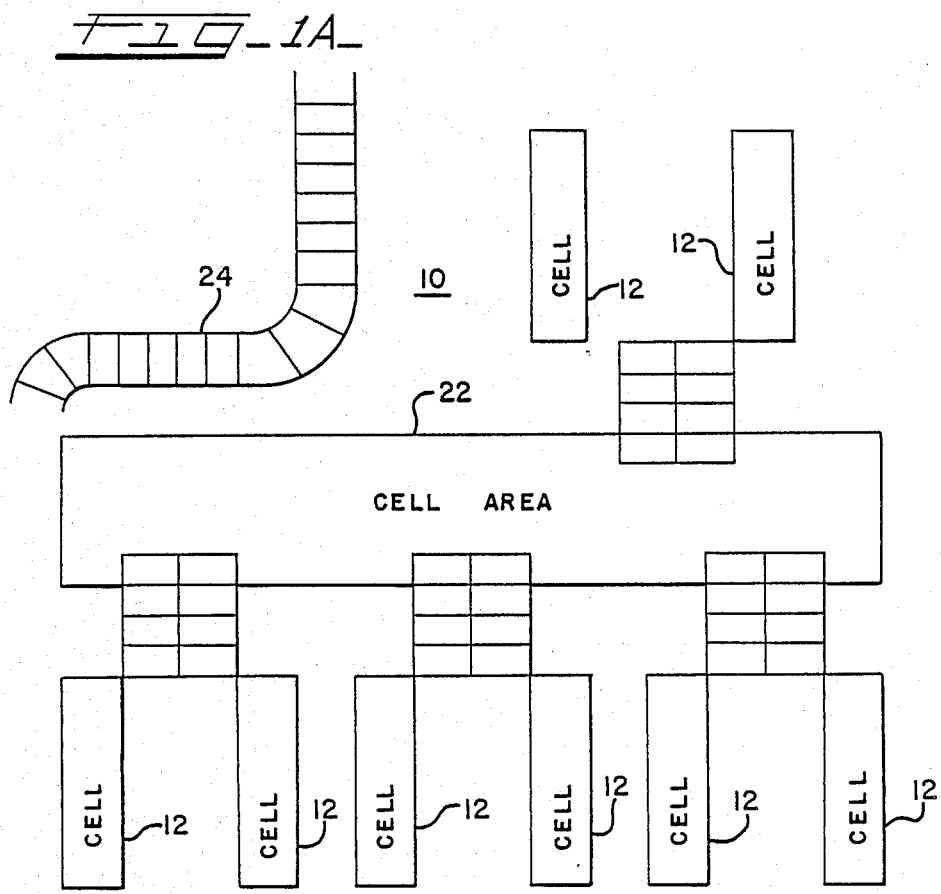
FIG_1A_
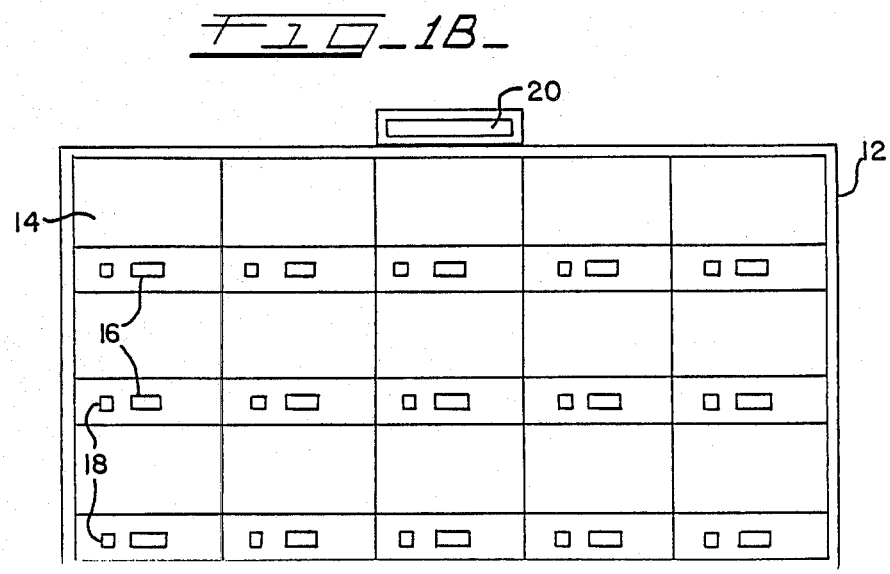
FIG_1B_

FIG_2A.
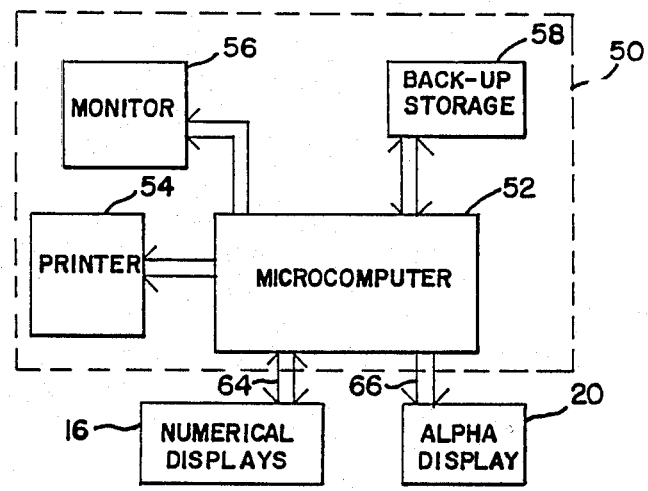
FIG_2B.
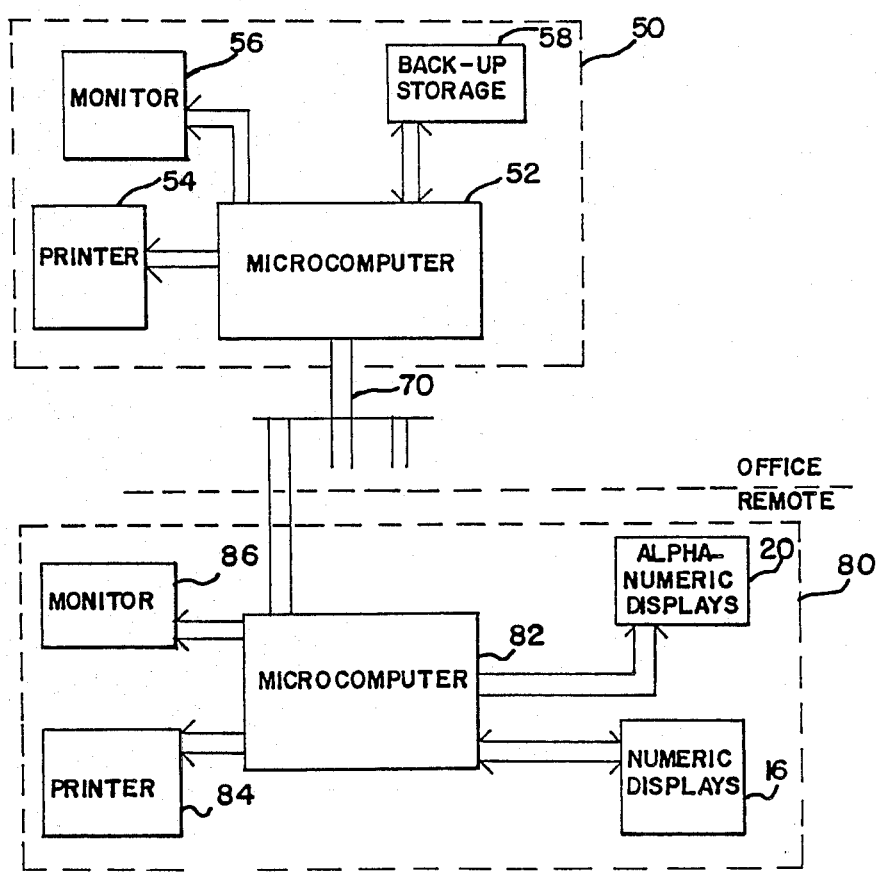

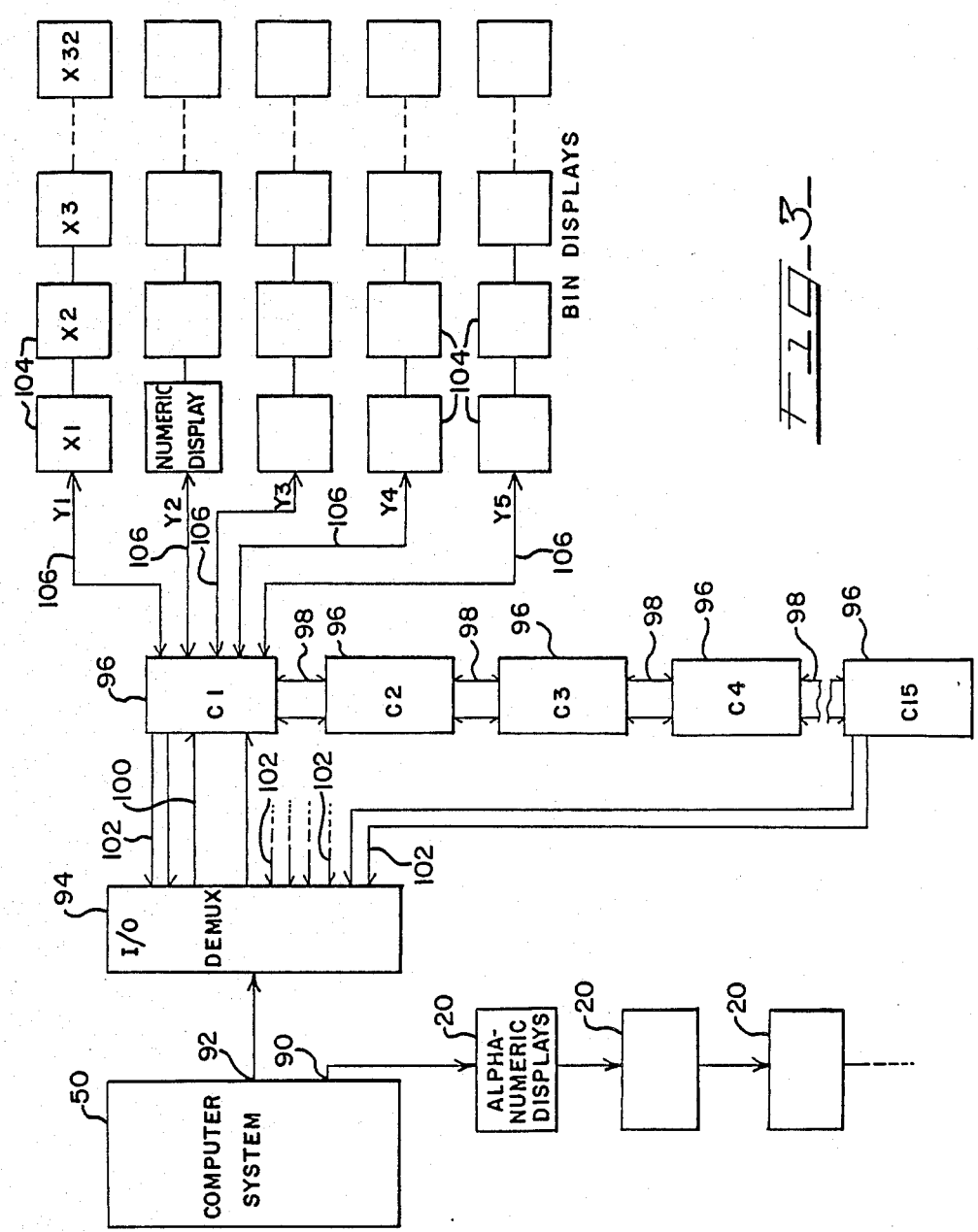

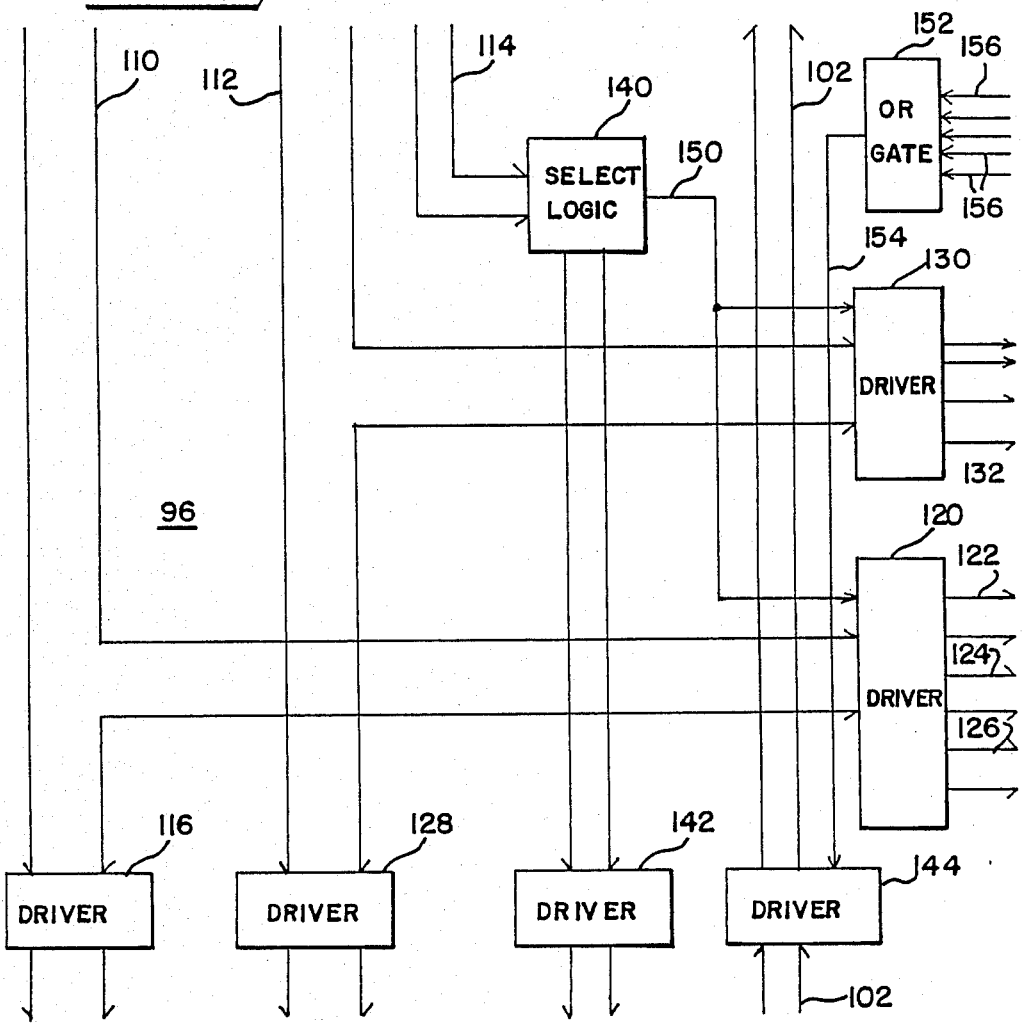
FIG-4-
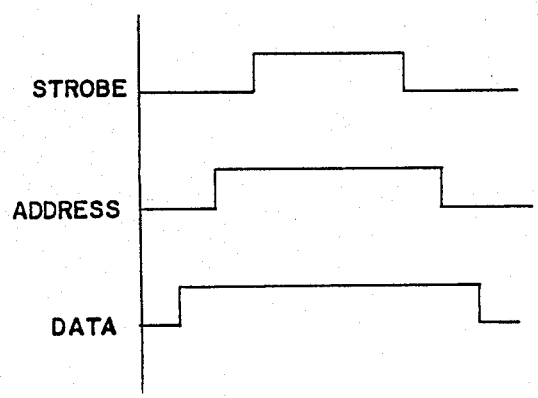
FIG-5B-

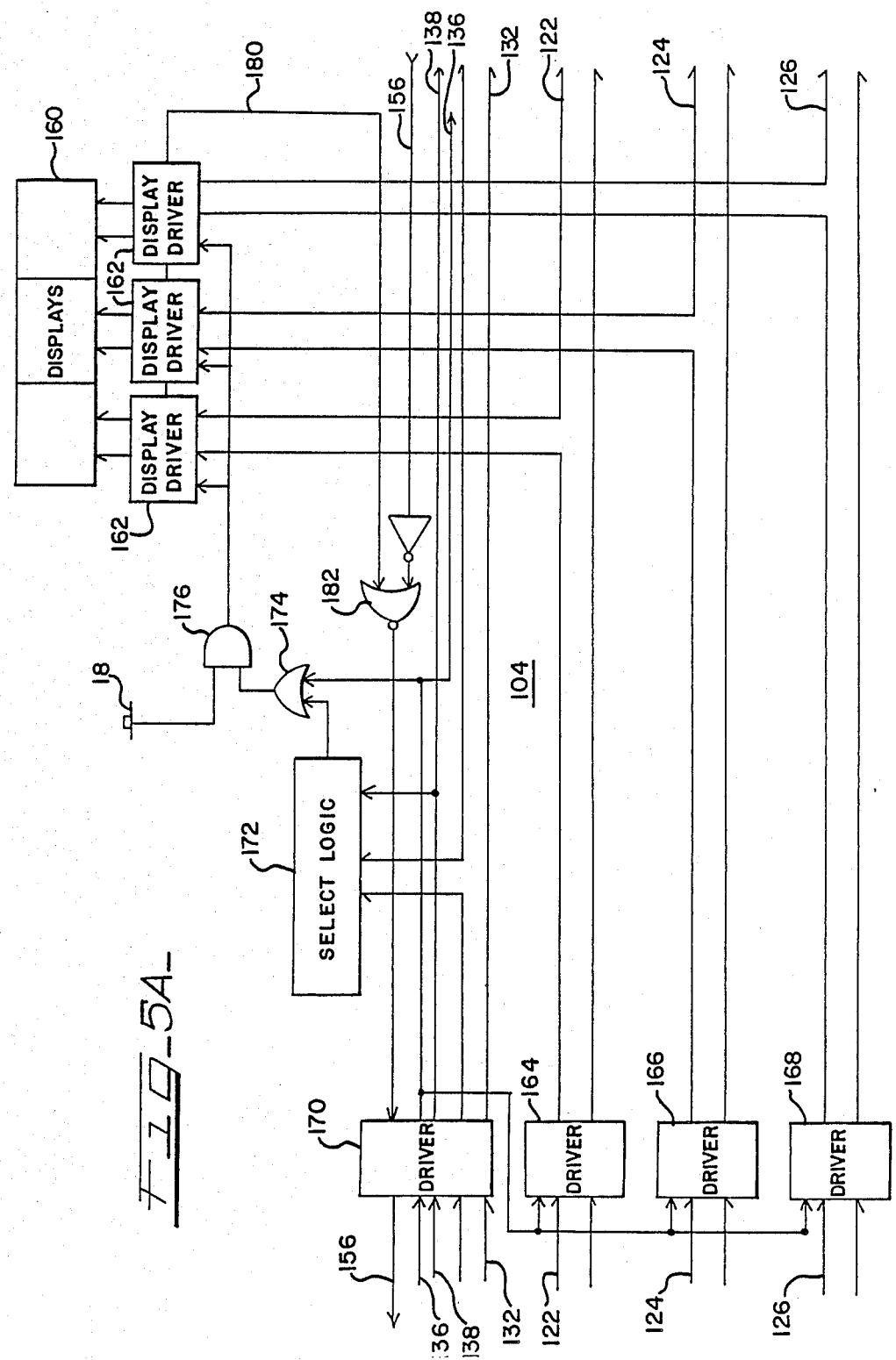
FIG-5A-

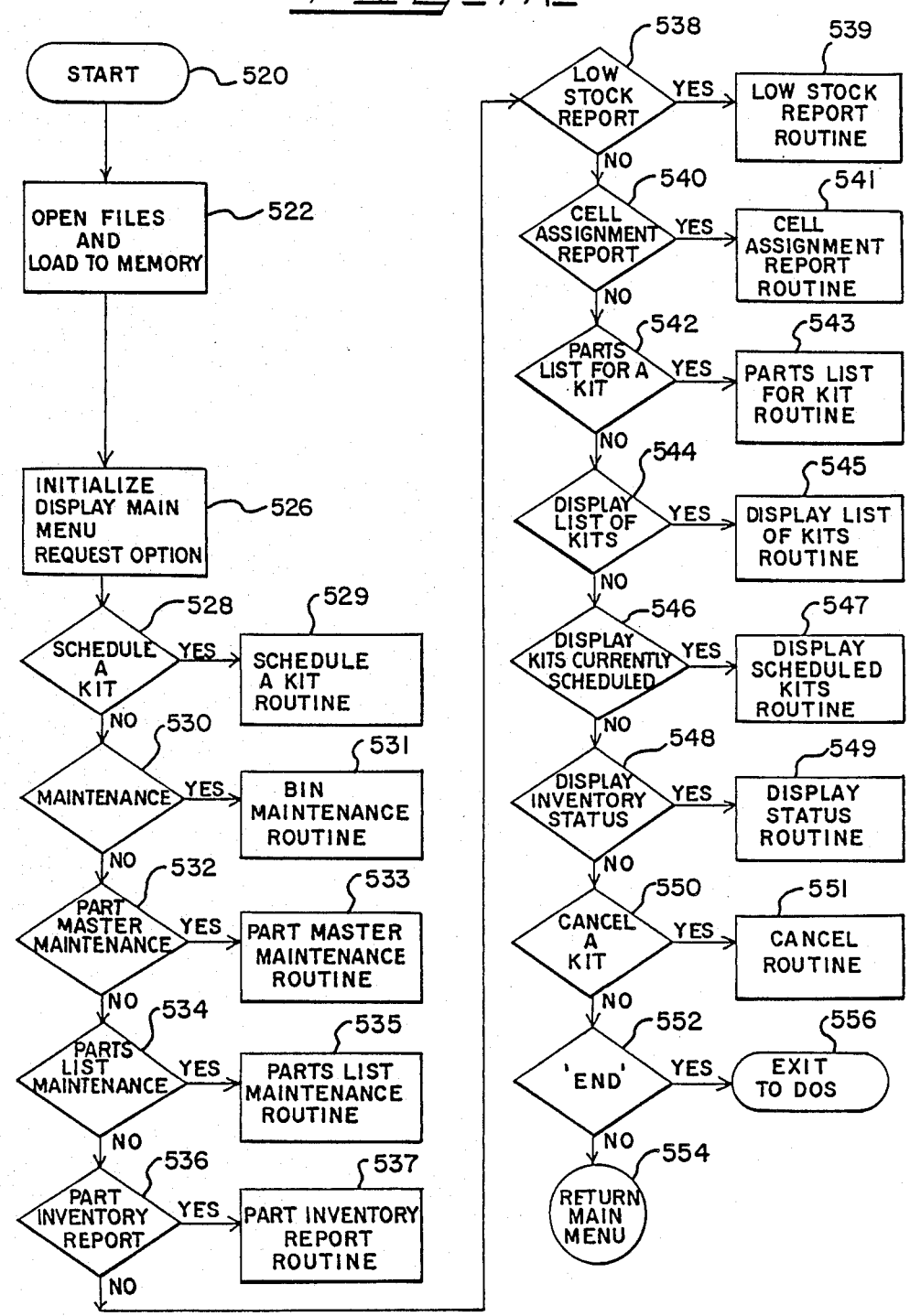
FIG_7A_

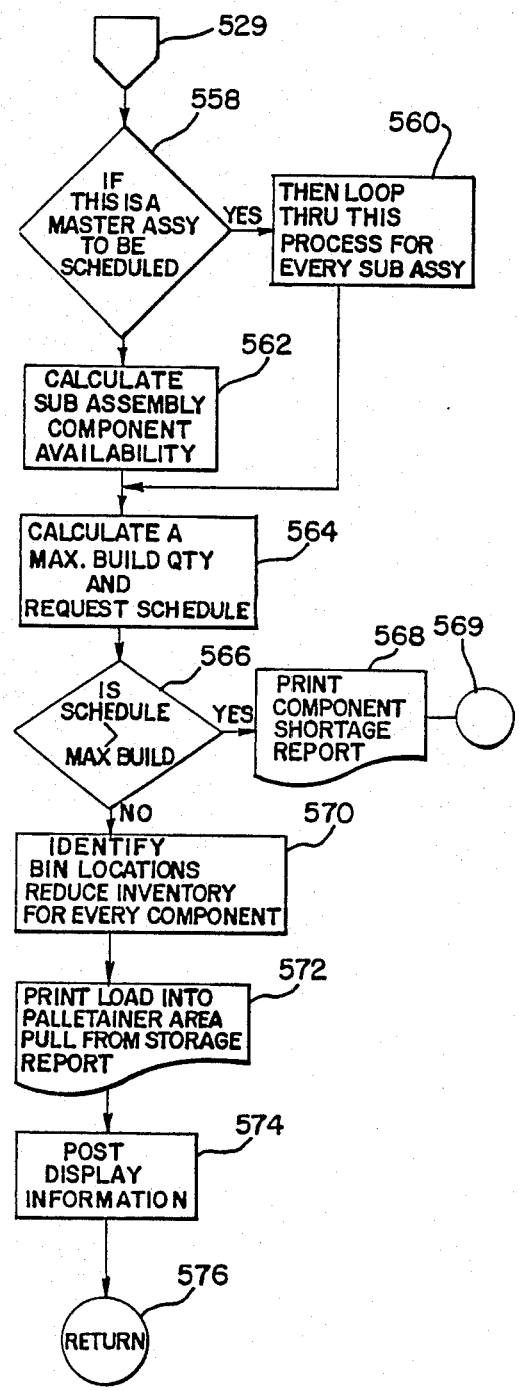
FIG_7B_
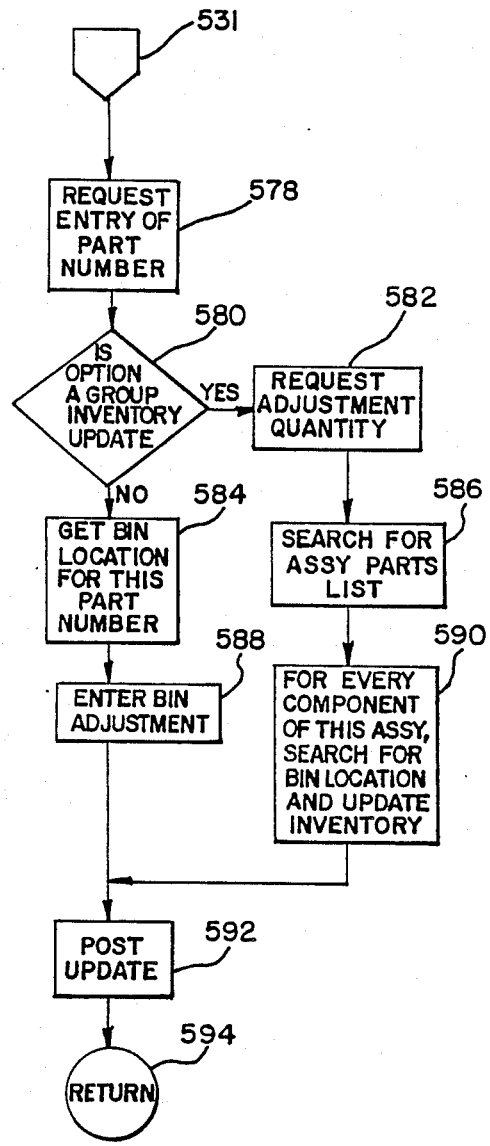
FIG_7C_

FIG-7D-
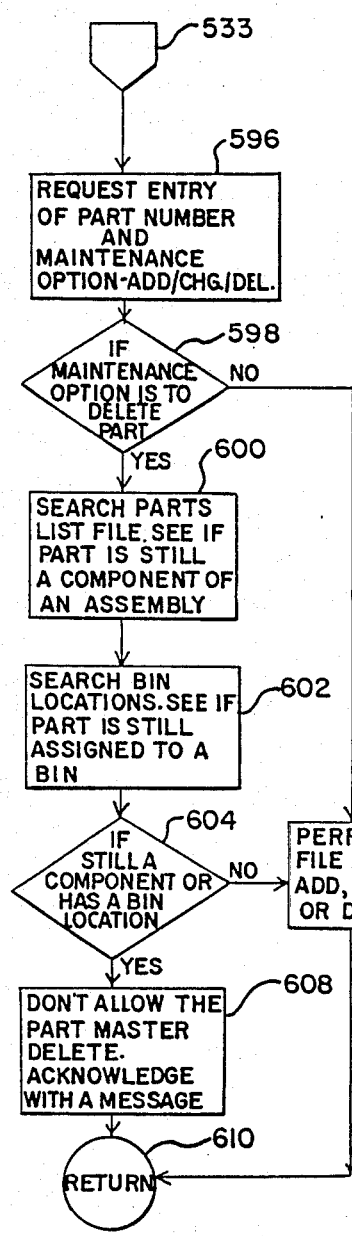
FIG-7E-
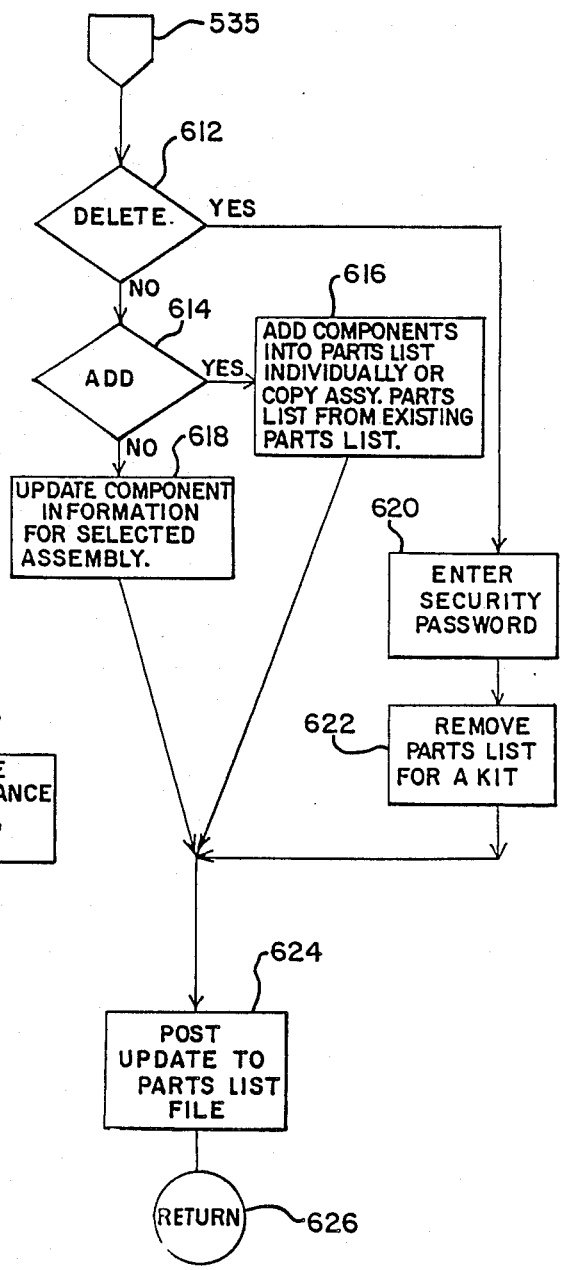

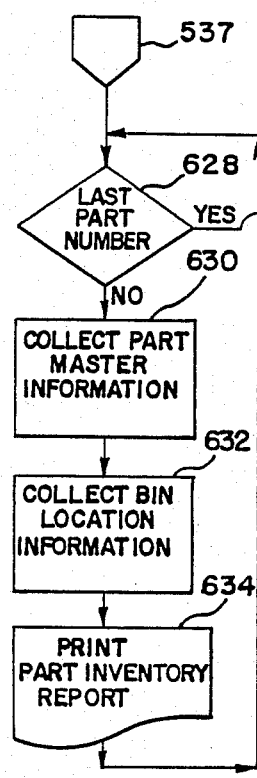
FIG_7F_
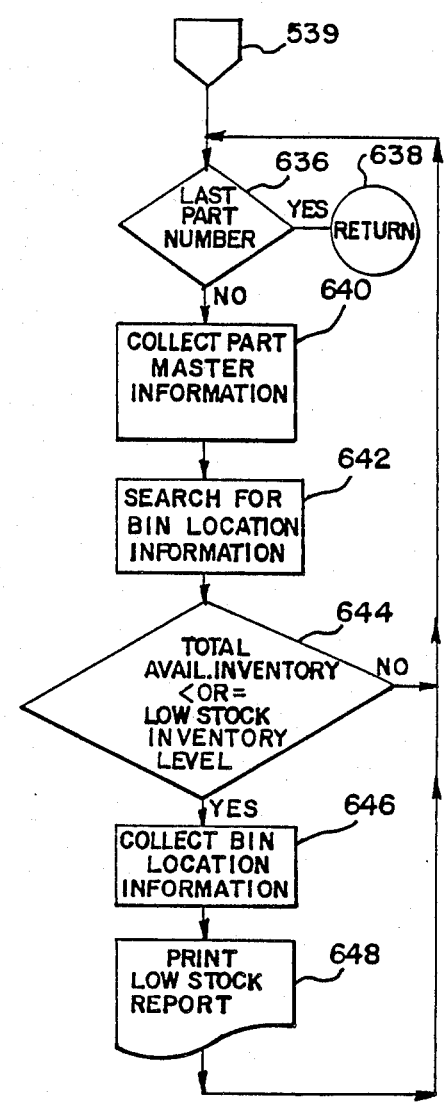
FIG_7G_

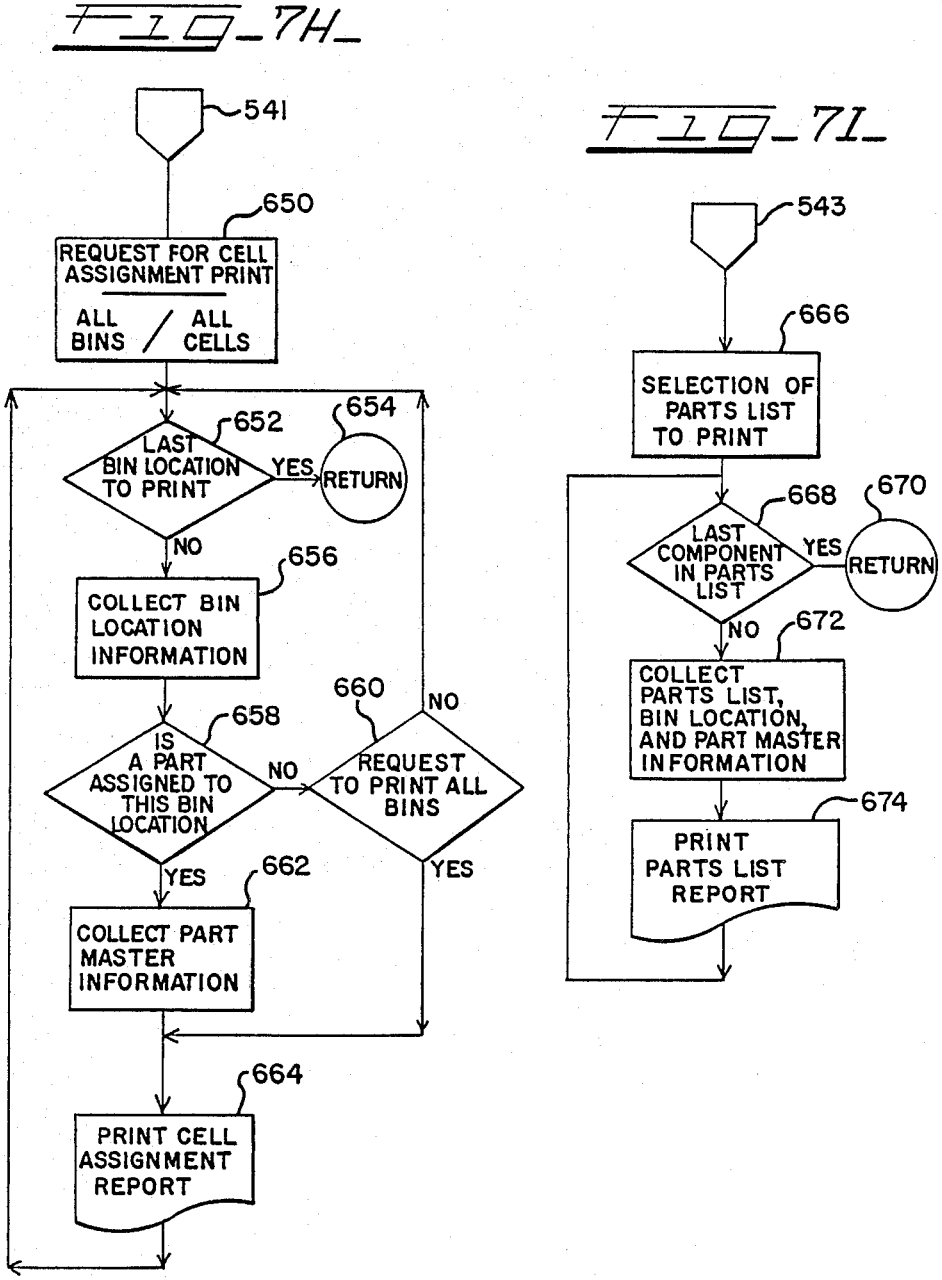

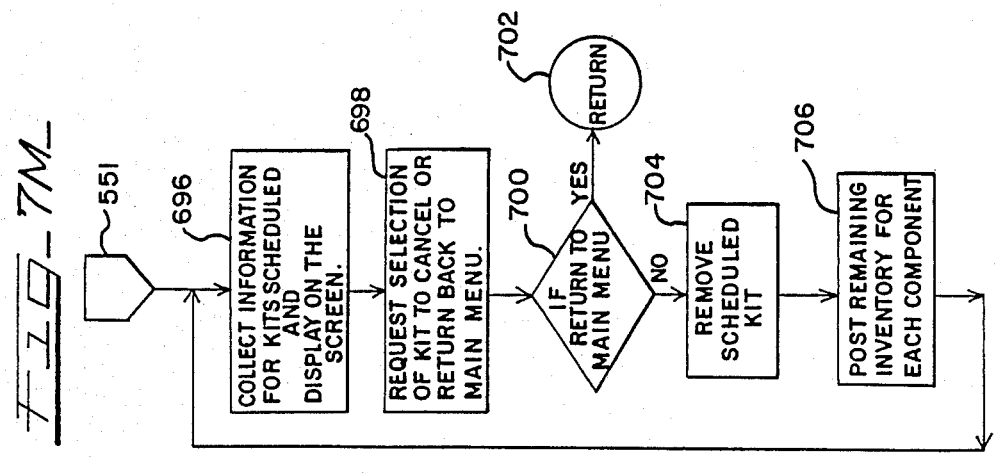
FIG-7M
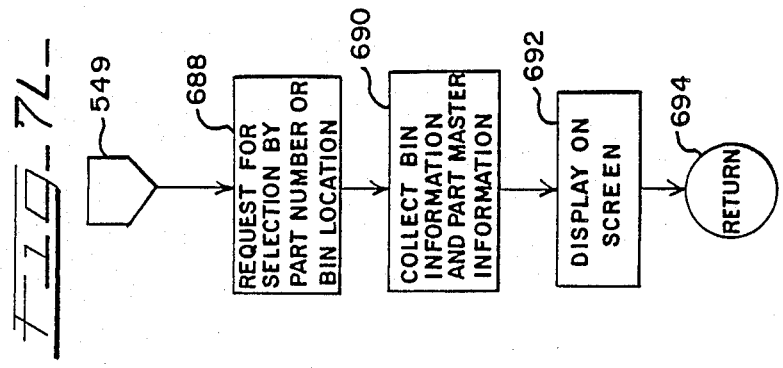
FIG-7L
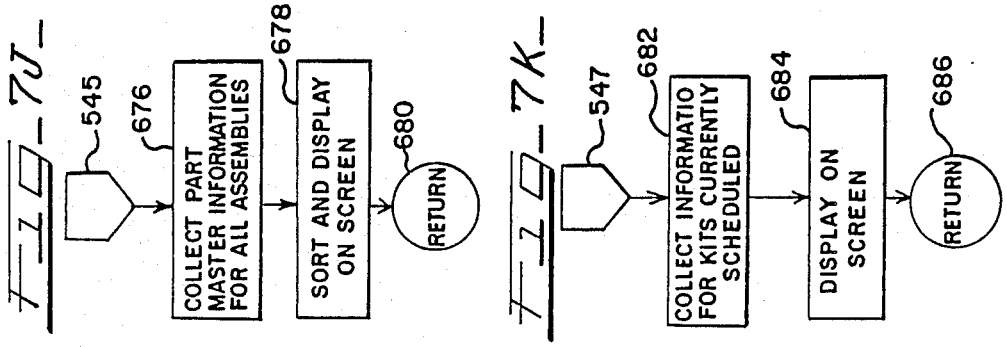
FIG-7J
FIG-7K

APPARATUS AND METHOD FOR PARTS ASSEMBLY

BACKGROUND OF THE INVENTION

This invention relates generally to the field of manufacturing and more particularly to a system for manufacturing multiple component assemblies utilizing computer-assisted semi-automated component kitting.

The modern manufacturing environment is highly competitive and constantly generating a need for new levels of efficiency in order to maintain a competitive advantage as well as to take advantage of market growth and adjust to product change. Thus, in existing component-assembly operations, substantial need exists for methods and apparatus to increase efficiency and reliability in assembly utilizing unskilled labor. In the modern consumer market, it has been found that consumers desire a distinctive product. This requires production of many similar but different products to meet the demand for distinctive products. However, in prior art assembly techniques, components were stored near the assembler and the assembly line work was required to select parts from these stored parts for assembly on the assembly line. Since many of the stored parts for various slightly different products are similar to each other, the assemblers find it difficult to differentiate between various components on a timely basis. Thus, a need exists for an improved method and apparatus for manufacture of multiple component assemblies which reduces the need for the assembler to make the parts selection decision.

It is accordingly an object of this invention to provide a novel system for manufacturing multiple component assemblies utilizing a computer-controlled component kitting system wherein a computer dictates the selection of the correct components and quantities of components by one assembler and wherein construction of the assembly is performed by another.

It is another object of the present invention to provide a novel manufacturing system which ensures that only complete component kits are selected.

It is yet another object of the invention to provide a novel manufacturing system of multiple component assemblies utilizing a plurality of component selection cells which may be controlled independently or as a hierarchy of interdependent cells by a central computer for collection of components for assembly.

Briefly, according to one embodiment of the invention, a system for use in assembling multiple component assemblies utilizing semi-automated component kitting is provided. The system includes at least one component selection cell having a plurality of component bins wherein each component bin has an associated numeric display means for display of component quantities required for the selected assembly model. Associated with each numeric display is a means for clearing the respective numeric display and for generating a control signal in response to clearing of all numeric displays of a cell for a selected assembly model. A computer control means is provided for controlling the numeric displays responsive to entry of a selected assembly model number and for entering a schedule of selected assemblies to be successively assembled with successive assembly displays activated in response to the control signal.

In one embodiment, the system permits a microcomputer system to control the manufacturing process by controlling the collection of parts to form kits of parts placed in trays which are used by assembly workers to make the desired assemblies. The system provides for indication to the workers of what parts are needed to collect a kit of parts to be used to make an assembly. This is accomplished by storing components in an array of bins with numeric displays above each bin to form a component selection cell. The lights indicate what quantity of the components in the bin is needed to build the assembly. The components are collected in a tray (i.e., forming a kit of parts) and delivered to the assembly worker on the assembly line. The assembly worker can then concentrate on assembly of the desired assembly and not concern himself with choosing from several similar but different components to attach to the assembly. The system may utilize a plurality of the component selections cells, each accommodating a worker to collect components to form a kit of parts in trays. Trays may then be transferred to a central area cell for transfer to the proper location on the assembly line for assembly by assembly line workers.

BRIEF DESCRIPTION OF THE DRAWINGS

The invention, together with further objects and advantages thereof, may be understood by reference to the following description taken in conjunction with the accompanying drawings.

FIG. 1A is a generalized diagram illustrating a specific embodiment of a manufacturing system layout according to the invention.

FIG. 1B is an illustration of a specific embodiment of a component selection cell such as shown in FIG. 1A.

FIG. 2A is a generalized block diagram illustrating a specific embodiment of a computer-assisted component kitting system for use with the manufacturing layout of FIG. 1 according to the invention.

FIG. 2B is a generalized block diagram illustrating an alternative embodiment of a computer-assisted component kitting system for use with the manufacturing layout of FIG. 1.

FIG. 3 is a detailed block diagram illustrating a specific embodiment of portions of the component kitting system of FIG. 2A.

FIG. 4 is a detailed block diagram illustrating a specific embodiment of the cell circuitry shown in FIG. 3.

FIG. 5A is a detailed block diagram illustrating a specific embodiment of the display circuitry shown in FIG. 4.

FIG. 5B is a timing diagram illustrating signal timing for FIG. 5A.

FIG. 7A–7M are detail flow diagrams illustrating the methodology and structural flow for the KIT program for a specific embodiment of the manufacturing system according to the invention.

DETAILED DESCRIPTION OF THE PREFERRED EMBODIMENT

Figure 6:
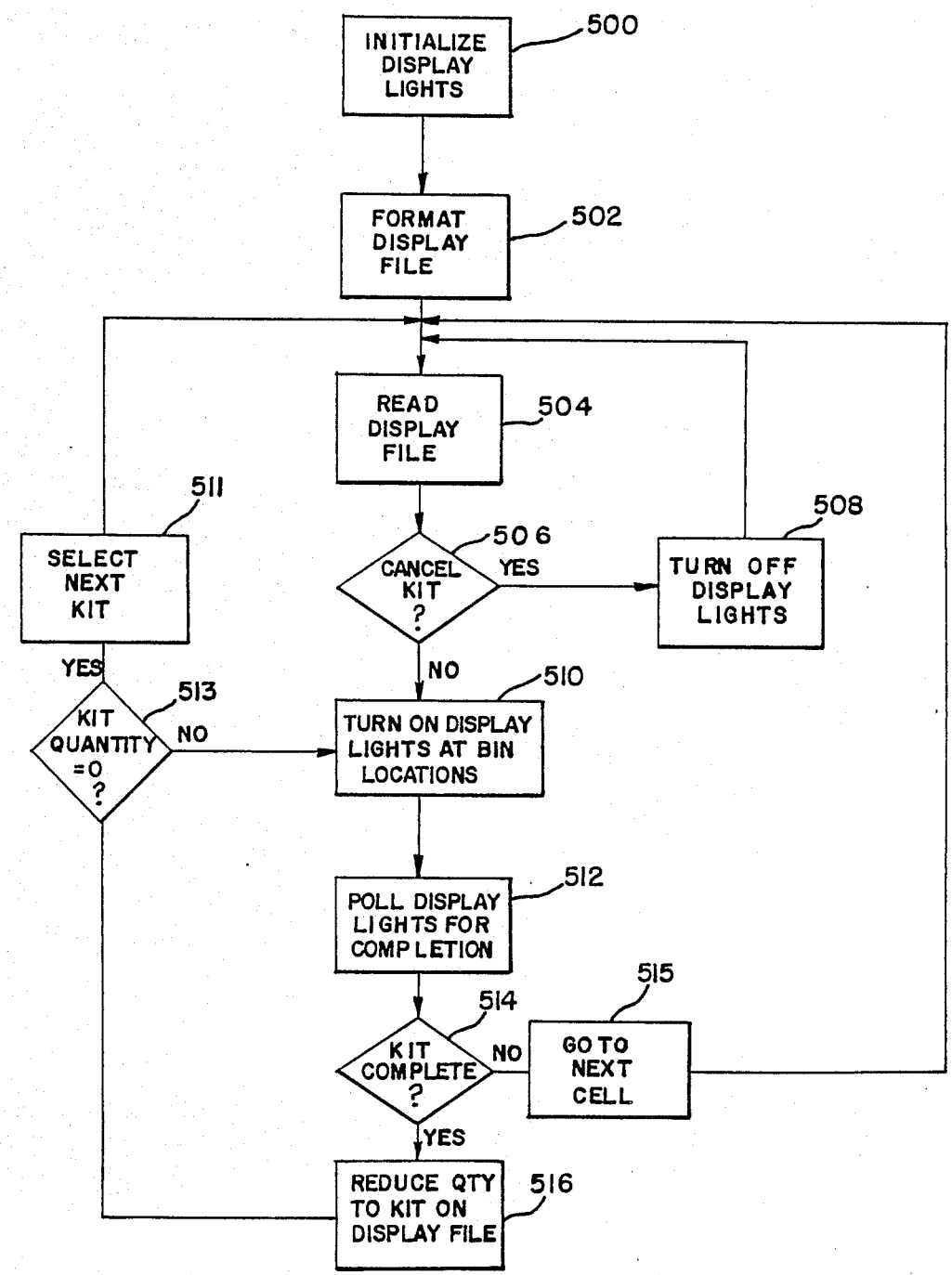
FIG. 6 is a detailed flow diagram illustrating the methodology and structural flow for the DISPLAY program for a specific embodiment of the manufacturing system according to the invention.

FIG. 1A is a generalized diagram illustrating a specific embodiment of a manufacturing system layout 10 for a manufacturing system according to the invention. The manufacturing system layout 10 comprises a plurality of component selection cells 12, as shown. Each component selection cell 12, as illustrated in the specific embodiment of FIG. 1B, includes multiple bins 14 of parts with a numeric display 16 for each bin which displays the number of parts which are to be retrieved from that bin. A push-button switch 18 is also provided to permit the numeric display 16 to be cleared after the required number of parts have been retrieved from the bin. In addition, an alphanumeric display 20 is provided with each cell 12 to display a description (e.g., assembly model number) of the assembly model selected for assembly.

The information displayed on the numeric displays 16 and the alphanumeric displays 20 is controlled by a central computer system 50 (shown in FIGS. 2A and 2B) based on assembly model information entered by an operator. In the illustrated embodiment, each cell 12 has associated with it an operator work bench (not shown) and a set of palletainers 30 which hold large components and assembled subassemblies. Further, as shown at one end of each cell 12 is a set of bins which provide for storage of completed parts trays (i.e., kits of parts) in a cell area 22. As shown, each of the cells 12 has a set of bins which provide storage of parts trays for the cell area 22. At a separate location, either nearby or remote, a computer system (see FIGS. 2A or 2B) under control of an operator controls the operation of the manufacturing system. An assembly line conveyor system 24 is located near the cell area 22, as shown. In an alternative embodiment, a single cell 12 can supply different parts kits to multiple assembly lines, each of which may be producing a different assembly.

A specific embodiment of the control circuitry for controlling the displays is illustrated in block diagram form in FIG. 2A. As shown, a central microcomputer system 50 is coupled to the numeric displays 16 via a bus 64, and is coupled to the alphanumeric displays 20 via a bus 66. The illustrated embodiment of the microcomputer system 50 includes a microcomputer 52 such as a PC-AT marketed by International Business Machines Corp., which may include internal random access memory (not shown, e.g., 640 Kbytes in the illustrated embodiment), internal hard disk storage (not shown, e.g., 30 Mbytes for files) and an internal floppy disk drive (not shown, e.g., 1.2 Mbytes or 360 Kbytes drives), as well as a printer 54, a monitor and keyboard 56 and backup storage device 58, configured as shown. The embodiment of FIG. 2A is primarily intended for use in close proximity to the manufacturing floor.

FIG. 2B illustrates in block diagram form an alternative embodiment of the display control circuitry particularly suitable for a system wherein the central control microcomputer system 50 is located in a remote office removed from the manufacturing floor. In the embodiment of FIG. 2B, a microcomputer system 50 not only includes the printer 54, the monitor 56, and the backup storage 58, but also includes local area network (LAN) hardware and software (e.g., TOKEN RING marketed by International Business Machines Corporation) within the microcomputer 52 which functions as a file server. This system is coupled by the local area network bus 70 to at least one, and optionally several, remotely located computer systems 80, as shown. The illustrated embodiment of the system 80 includes a microcomputer 82 (e.g., an International Business Machines Corp. PC-AT with internal random access memory and internal floppy disk storage) coupled to a conventional printer 84, a conventional monitor 82 and to the alphanumeric displays 20 and the numeric displays 16, as shown. Thus, the embodiment of FIG. 2B is a network system which permits control of a plurality of manufacturing operations from a remote location.

In operation, the system permits an operator of the microcomputer system 50 to control the manufacturing process by controlling the collection of parts to form kits of parts placed in trays which are used by assembly workers to make the desired assemblies. The system provides for indication to the workers of what parts are needed to collect a kit of parts to be used to make an assembly. This is accomplished by storing components in an array of bins with numeric displays above each bin to form a component selection cell 12. The lights indicate what quantity of the components in the bin is needed to build the assembly. The components are collected in a tray (i.e., forming a kit of parts) and delivered to the assembly worker on the assembly line. The assembly worker can then concentrate on assembly of the desired assembly and not concern himself with choosing from several similar but different components to attach to the assembly. In a specific embodiment, the system may utilize a plurality of the component selections cells 12, each accommodating a worker to collect components to form a kit of parts in trays. Trays are transferred to a central area cell 22 for transfer to the proper location on the assembly line 24 for assembly by assembly line workers. Thus a single cell may be used to make kits for a wide variety of assemblies or a plurality of cells arranged independently or in a hierarchy of at least two levels may be utilized.

The operator may enter via the monitor/keyboard 56, the desired assembly model number and the associated quantity to be built. The system can then provide to the operator the maximum quantity that can be built if the maximum is less than the requested quantity. The operator can then select this maximum quantity or select the desired quantity of a different assembly for the system to schedule. The system also can determine what subassemblies need to have kits of parts prepared and need to be built based on the build quantities determined by the system for final assembly, and based on the number of such subassemblies which have already been built. When a subassembly is prepared and not used in the construction of a final assembly, it is stored off line to be used later, and record kept by the computer 52. Additionally, an operator may enter a schedule of selected assemblies to be successively assembled for an entire day via the monitor/keyboard 36 which the system then processes to continuously direct kit assembly for an entire day of product assembly.

An alphanumeric display is utilized with each component selection cell so that the microcomputer system 52 can display the assembly model description to be built to the cell worker. The numeric display over each bin directs the worker to the correct component and the quantity needed for the desired assembly. A switch 18 (e.g., push-button switch) is provided with each numeric display which permits the operator to clear the display and acknowledge that the displayed number of the part has been selected and placed in the tray. When the last light for a particular assembly model has been turned off, a signal is generated and the central computer then cycles the alphanumeric display and light displays based upon the number of assemblies to be built. In this manner, different assembly models may be mixed so that a kit of parts may be collected for one model, then a kit of parts for a different model, etc.

In addition to controlling the displays which direct worker parts collection, the system also provides for inventory control of components and generation of various reports. Thus, the system provides for updating its memory to decrease the components indicated as being available by the appropriate quantity when the assembly is scheduled, as well as providing for two levels of bill of materials with multiple subassemblies feeding into a final product scheduling. The system provides for scheduling of either subassemblies or end product assemblies, and permits the generation of parts list from existing lists. In addition, the components inventory may be updated at the assembly level, and engineering change of components can be made by changing one part to another with the single entry, thereby permitting a change of all references to that part. If desired, a scheduled assembly can be cancelled before completion, thereby reinstating all the component inventories associated with it. A simulation capability is provided, which permits the operator to perform "what if" inquiries, thereby determining what assemblies can be built, and what additional parts may be needed for a day's production run.

Printed reports may be generated using the microcomputer system 50, including reports such as parts lists and a low stock report, which generates a list of parts which are available in quantities below a predetermined threshold. Also, part inventory reports, cell assignment reports, component shortage reports, and off-site material move reports may be generated. In addition, CRT display reports may be generated, such as inventory status based on part number or bin location, status of collection of a particular kit of parts, or a list kits which may be scheduled.

Additional features provided by the system include the ability for a two-level kit structure with the scheduling of the higher level netted by available subassemblies, and then pass to the next lower level. Off-line subassemblies may be tracked, as well as the generation of material move reports as kits are scheduled using off-line subassemblies. Move reports of materials are automatically generated for kits scheduled which have parts which are not stored on line, and inventory maintenance is provided at a subassembly level, which permits updates of all parts in the bins for components of subassemblies.

The operator of the system utilizes the system by selecting a desired function from a master menu. The master menu provides, in the illustrated embodiment, a total of thirteen choices as follows: (1) schedule a kit, (2) bin maintenance, (3) part master maintenance, (4) parts list maintenance, (5) part inventory report, (6) low stock report, (7) cell assignment report, (8) parts list for a kit, (9) display list of kits, (10) display kits currently scheduled, (11) display inventory status, (12) cancel a kit, and (13) end.

Referring now to FIG. 3, there is shown a detail block diagram illustrating a specific embodiment of a computer assisted materials handling system according to the invention. The system comprises the computer system 50, which is coupled via an RS-232C serial interface 90 to a set of alphanumeric displays 20 (e.g., such as the 23 character alphanumeric display marketed by Vorne Industries, Inc., Model No. 2015S-1-485-485-120-C), configured in serial fashion, as shown. The alphanumeric displays 20 in the illustrated embodiment include internal decoding circuitry to permit serial configuration. In addition, the computer system 50 is coupled via a RS-422 interface 92 to an I/O interface 94, which is a conventional de-multiplexor, which provides a serial to parallel interface (e.g., an Optimux 22 Series de-multiplexor), as shown.

The de-multiplexor 94 provides an interface to the computer system 50 and a set of cell control circuitry modules, as shown. Each component selection cell utilizes a cell control circuitry module, and the system, as illustrated, is designed to accommodate fifteen cells, as shown. The cell circuitry 96 is configured to couple to each other via a bus 98, as shown, in a series structure, and then cell control circuitry is coupled to the de-multiplexor 94 via the outgoing data and address bus 100 and the incoming display status buses 102, as shown. Each cell control circuitry module 96 is coupled to an array of bin display circuits 104, which are coupled to the cell circuitry 96 in series via a bus 106, as shown. In the illustrated embodiment, the bin displays may include up to 32 displays in series and up to 5 sets of such series displays, as shown in FIG. 3.

FIG. 4 shows a detail block diagram illustrating a specific embodiment of the cell control circuitry module 96 of FIG. 3. The cell control circuitry 96 comprises a data bus 110, an address and strobe bus 112, and a cell address bus 114, as shown. Each of these buses are coupled from the previous cell module, or from the de-multiplexor in the case of the first cell control circuitry module 96. The data bus 110 is coupled to a line driver 116 (e.g., a 74LS244 marketed by Texas Instruments, Inc.) and a line driver 120 (e.g., a 74LS241 marketed by Texas Instruments, Inc.), as shown. The line driver 116 couples the data signal to the next cell module, and the driver 120 couples the data to the bin display circuits 104 via the buses 122, 124 and 126.

The address and strobe bus 112 is coupled to a line driver 128, which couples the address and strobe signal to the next cell control circuitry module. The address and strobe bus 112 is also coupled to a line driver 130, which couples the address and strobe information to the bin displays 104 via a bus 132 and via signal lines 136 and 138. The cell address bus 114 is coupled to the select logic 140 and through the select logic 140 to a line driver 142, which couples the cell address signals to the next cell control circuit 96. A line driver 144 couples display status information from a bus 102 to the previous cell control circuitry module via a bus 102, as shown. The select logic 140 couples a select control signal to the drivers 130 and 120 via a select control signal line 150, as shown. In addition, an OR-Gate 152 couples a control signal to the driver 144 via a control signal line 154, in response to the display status lines 156 from the five series sets of bin displays 104 (See FIG. 5A).

Referring now to FIG. 5A, there is shown a detail block diagram illustrating a specific embodiment of the bin display circuitry 104 of FIG. 3. The bin display circuits 104 are coupled in series with up to 32 devices in series, and comprise a LED display 160 (e.g., a Monsanto 6960) of three digits, which are driven by a set of latch display drivers 162 (e.g., a 9374 latch display driver such as marketed by Texas Instruments Corp.). Coupled into the circuit 104 is data from the data buses 122, 124 and 126 from the previous bin display circuit, or, in the case of the first circuit in the series, from the cell control circuitry module 96. This data is coupled through a set of line drivers 164, 166, 168 (e.g., 74LS241 marketed by Texas Instruments, Inc.), and is coupled respectively to the appropriate display drivers 162, thereby, providing the display data to the display device 160. The data from the drivers 164, 166 and 168 is coupled to the next bin display circuit via the buses 122, 124 and 126, as shown. In addition, address information is coupled into the bin display circuit 104 via the address bus 132 from the cell control circuitry module 96 if the circuit is the first in the bin display control series, and from the previous bin display circuitry if it is not the first in the series. This address information is coupled through a line driver 170 to the display select logic 172, and through to the next bin display circuit via the bus 132. In addition, the two control signal lines 136 and 138 are coupled through the driver 170.

The signal on the line 138 is a strobe signal coupled through the driver 170 to the select logic 172, and continuing to the next bin control circuit via the line 138, as shown. The control signal on line 136 is the data clock signal, which is coupled through the driver 170 to the enable inputs of the data bus drivers 164, 166 and 168, as shown. In addition, the data enable signal is coupled through an OR-Gate 174 and on to the next bin display circuit via the line 136, as shown. The second input of the OR-Gate 174 is a control output from the select logic 172, which is ORed with the data enable signal, the output of which is coupled one of the inputs of an AND-Gate 176. The second of the input of the AND-Gate 176 is the output of the clearing switch 18. Thus when the switch 18 is activated, the displays are cleared, and when the appropriate address activates the select logic, the data on the data lines is clocked in to the display drivers. When the display driver is cleared by the reset button, a signal was generated on the line 180 which is ORed in an OR-GAte 182 with a display status signal coupled from the next bin display on the line 156, as shown. These two signals are ORed by the OR-Gate 182, resulting in a signal which indicates when the display has been cleared on the previous display circuits as well as the instant display circuit, and that signal is coupled through the driver 170, and out through the next circuit in the series via the display status line 156. Thus at the end of the series, the ORed signals provide a signal which indicates when all the displays in that series have been cleared.

FIG. 5B is a timing diagram illustrating the relationship between the strobe timing signal on the line 138 and the data enable clock on line 136 and the address enable signal, which is on the address bus 132.

Referring now to FIG. 6 and FIGS. 7A-7M, there is shown generalized flow diagrams illustrating the methodology and structural flow for the programs for a specific embodiment of the manufacturing system according to the invention. The systems programs are configured to run under a multi-tasking system such as Double-DOS which runs two programs simultaneously. The two programs are (1) a KIT program which primarily handles batch file maintenance and scheduling and (2) DISPLAY which primarily functions as the real time program that controls the displays. The programs communicate with each other through a file stored in virtual memory.

FIG. 6 shows a block diagram of the DISPLAY program which begins at block 500 where the display lights are initialized. Program control immediately proceeds to block 502 where the display file is formatted after which program control proceeds to block 504 where the display file information is read into memory. After the display file is read, a logic function is performed as illustrated by block 506 where it is determined whether the parts kitting process should be cancelled or not. If the result is affirmative, program flow branches to block 508 where the display lights are turned off, and then back to block 504, as shown. If the result at block 506 is negative, processing flow is directed to block 510, where the display lights at the appropriate bins are turned on after which the display lights are polled for completion of the parts selection for the desired assembly, and a logical test is performed to determine whether the process has been completed as illustrated by blocks 512 and 514. If the kitting process has not been completed, processing control branches to block 515 where the system goes to the next cell and repeats the display process by returning to block 504, as shown. If the kitting process has been completed, processing flow proceeds to block 516 where the inventory values within the computer are updated to indicate the reduction in quantities in the parts bins. Processing control then branches back to block 513, where a test is performed to determine whether the kit quantity has reached zero. If the result is negative, processing flow branches to block 510, and if affirmative, the next kit is selected, as illustrated at block 511 after which program control returns to block 504, as shown.

FIGS. 7A-7M show generalized flow diagrams illustrating the methodology and structural flow for a specific embodiment of the KIT program and associated subroutines. In FIG. 7A, the KIT program starts at block 520 with processing beginning at block 522, where initialization, opening and loading of files into active memory is performed. After the initialization process 522 the main menu is initialized and displayed, as illustrated at block 526, permitting the operator to request a variety of options. As shown, the program then performs a series of tests to determine what selection has been made for the operator from the main menu.

Beginning with block 528, a test is performed to determine whether a scheduling of a kit has been selected, and if the result is affirmative, program flow branches to the schedule subroutine as indicated as block 529. If the result at block 528 is negative, program flow proceeds to block 530 to determine whether a bin maintenance process has been selected, and if affirmative, processing flow branches to the bin maintenance subroutine as indicated by block 531, and if the result is negative, program flow is directed to block 532. At block 532, a test is performed to determine whether a part master maintenance function has been selected and if the result is affirmative, processing flow branches to the part master maintenance subroutine, as indicated at block 533, and if the result is negative, processing flow is directed to block 534. At block 534, a test is performed to determine whether a parts list maintenance has been selected, and if affirmative, processing flow branches to the parts list maintenance subroutine, as illustrated by block 535, and if negative, processing flow is directed to block 536, as shown. At block 536, a test is performed to determine whether a parts inventory report function has been selected, and if affirmative, processing flow branches to the parts inventory report subroutine, as illustrated by block 537, and if the result is negative, processing flow proceeds to block 538.

A test is performed at block 538 to determine whether a low stock report function has been selected and if the result is affirmative, program flow branches to the low stock report subroutine, as indicated at block 539, and if the result is negative, processing flow is directed to block 540. At block 540, a test is performed to determine whether the cell assignment report function has been selected, and if the result is affirmative, processing flow branches to the cell assignment report subroutine, as indicated by block 541, and if the result is negative, processing flow continues directly to block 542. At block 542, a test is performed to determine whether a parts list for a kit has been requested, and if the result is affirmative, processing flow branches to the parts list subroutine, as indicated at block 543, and if the result is negative, processing flow proceeds directly to block 544. At block 544, a test is performed to determine whether a display of a list of kits has been requested, and if the result is affirmative, processing flow branches to the display list subroutine, as illustrated at block 545, and if the result is negative, processing flow is directed to block 546. At block 546, a test is performed to determine whether a display kit currently scheduled has been requested, and if the result is affirmative, processing flow branches to the display kit subroutine, as illustrated by block 547, and if the result is negative, processing flow continues to block 548.

At block 548, a test is performed to determine whether a display of inventory status has been requested, and if the result is affirmative, processing flow branches to the display inventory subroutine, as illustrated by block 549, and if the result is negative, processing flow proceeds to block 550. At block 550, a test is performed to determine whether a cancellation of a kit has been requested, and if the result is affirmative, processing flow branches to the kit cancel subroutine, as illustrated by block 551, and if the result is negative, processing flow is directed to block 552. At block 552, a test is performed to determine whether an end has been requested, and if the result is affirmative, processing flow branches to the disk operating system, as indicated by block 556, and if the result is negative, the processing flow branches back to the main menu of block 526, as illustrated at block 554.

Referring now to FIG. 7B, there is shown a flow diagram illustrating the methodology and structural flow for the schedule subroutine which is entered at 529, as shown. Processing begins with a test to determine whether a master assembly is to be scheduled, as shown at block 558. If the result at block 558 is affirmative, processing flow branches to block 560, where control flags are initialized to set up a process to loop through the subassembly calculations for each subassembly of the master assembly, after which processing flow proceeds to block 564. If the result at block 558 is negative, processing flow proceeds directly to block 562 where subassembly component availability calculation is made to determine parts availability after which a maximum build quantity is calculated and a schedule is requested as illustrated at block 564. Processing flow then continues to block 566, where a test is performed to determine whether the schedule request is greater than the maximum build quantity calculated, and if the result is affirmative, a component shortage report is printed, as illustrated at block 568, after which processing flow returns to the display menu at block 526 of FIG. 7A, as shown at block 569. If the result at block 566 is negative, processing flow proceeds to block 570 where the bin locations are identified and the inventory for each component in each bin is reduced. Processing flow then proceeds to block 572 where a printout of subassemblies loaded on the palletainer is provided based on a storage report, and after which the information is displayed, as illustrated at block 574, after which processing flow returns to the main menu of block 526, as illustrated at block 576.

The methodology and structural flow of a specific embodiment of a bin maintenance subroutine is shown in detail in the flow diagram of FIG. 7C, which is entered at block 531 and immediately proceeds to block 578, where entry of a part number is requested after which processing flow proceeds to block 580. At block 580, a logical test is performed to determine if a group inventory update has been requested, and if the result is affirmative, processing flow branches to block 582, where an adjustment quantity is requested from the operator at block 582, subsequently a search for the assembly parts list is performed at block 586 and for every component of the assembly, a search is made for the bin location, followed by an update of the inventory, as illustrated by block 590 after which process flow proceeds to block 592, as shown. If the result at block 580 is negative, processing flow continues to block 584, where the bin location for the part number is identified and then, as indicated at block 588, the adjustment to the bin contents is entered and then the updates are posted, as indicated at block 592. Process control then returns to the main menu of block 526, as illustrated by block 594.

Referring now to FIG. 7D, there is shown a generalized flow diagram illustrating the methodology and structural flow for the parts master maintenance subroutine, which is entered at block 533, as shown. Processing begins at block 596 where a parts number entry is requested, as well as maintenance options (such as add, change or delete), after which a logic test is performed to determine if the maintenance option is to delete a part, as shown at block 598. If the result at block 598 is negative, processing control branches to block 606, as shown, and if the result at block 598 is affirmative, processing flow proceeds to block 600 where the parts list file is searched to determine if the part number entered is still a component of an assembly. Processing flow then continues to block 602 where bin locations are searched to determine if the part is assigned to a bin, after which processing flow proceeds to block 604, where a test is performed to determine if the component or bin location still exists. If the result at block 604 is negative, processing flow branches to block 606, where file maintenance is performed to add, change or delete the part number, after which processing flow continues directly to block 610. If the result at block 604 is affirmative, the deletion from the master part list is inhibited and a acknowledged message is generated as illustrated by block 608, after which processing control returns to the main menu of block 526, as illustrated by block 610.

The methodology and structural flow for a specific embodiment of a parts list maintenance subroutine, which performs the parts list maintenance functions, is shown in the flow diagram of FIG. 7E and is entered, as shown, at block 535. Processing begins at block 612, where a test is performed to determine whether a delete has been requested, and if the result is affirmative, processing flow branches to block 620, where a security password is requested, and then to block 622, where the removal of the parts list to be deleted is performed after which processing flow continues to block 624, as shown. If the result at block 612 is negative, processing flow is directed to block 614, where a test is performed to determine whether the function to be performed is an addition, and if the result is affirmative, processing flow branches to block 616, as shown. At block 616, the components to be added to a parts list are added or parts lists from existing lists are copied over, after which processing flow proceeds to block 624, as shown. If the result at block 614 is negative, processing flow continues to block 618, where component information is updated for the selected assembly, and processing flow then proceeds to block 624, at which the updates are posted to the parts list file. Subsequently, processing control returns back to the main menu of block 526, as illustrated by block 626.

FIG. 7F is a flow diagram illustrating the processing methodology and structural flow for a specific embodiment of the parts inventory report subroutine, which is entered, as shown, at block 537. Processing begins with block 628, where a test is performed to determine whether the last part number report has been printed, and if the result is affirmative, processing flow returns to the main menu of block 526, as illustrated by block 629. If the result at block 628 is negative, processing flow proceeds to block 630 where the master parts information is collected, and then to block 632, where the bin location information is collected. Processing flow then continues to block 634, where the part inventory information report is printed and processing control then branches back to block 628, as shown.

Referring now to FIG. 7G, there is shown a generalized flow diagram illustrating the methodology and structural flow for a specific embodiment of the low-stock report subroutine, which is entered, as shown, at block 539. Processing begins with block 636, where a last part number test is performed to determine if the last part number of the report has been reached, and if the result is affirmative, processing flow returns to the main menu of block 526, as shown at block 638. If the result at block 636 is negative, processing flow proceeds to block 640, where the part master information is collected, and then to block 642, where a search for the bin location information is performed. Processing flow then proceeds to block 644, where a test is performed to determine whether the total available inventory is greater than or equal to the predetermined low stock inventory level. If the result is negative, processing flow branches back to block 636, as shown, and if the result is affirmative, processing flow proceeds to block 646, where bin location information is collected. Processing flow then continues to block 648, where the low-stock report is printed, and after which processing flow branches back to block 636, as shown.

The methodology and structural flow for a specific embodiment of a cell assignment report subroutine is illustrated in the flow diagram of FIG. 7H, which is entered at block 541, as shown. Processing begins at block 650, where a request is made for the cell assignment to be printed, as well as for a selection of printing of a report for all bins or all cells. Processing flow then proceeds to block 652, where a test is performed to determine whether the last bin location to be printed has been reached, and if the result is affirmative, processing control returns to the main menu of block 526, as illustrated at block 654. If the result is negative, the bin location information is collected, as shown at block 656, and then a test is performed to determine whether the part is assigned to a bin location, as illustrated by block 658. If the result is negative, a test is performed to determine whether a request was made to print all bins, as shown at block 660. If the result is affirmative, processing flow proceeds to block 664, as shown, and if the result is negative, processing flow branches back to block 652. If the result at block 658 is affirmative, processing flow continues to block 662, where the master part information is collected, after which processing flow proceeds to block 664, where the cell assignment report is printed, and processing control branches back to block 652, as shown.

In FIG. 7I, a flow diagram is shown illustrating the processing methodology and structural flow for a specific embodiment of the parts list for a kit subroutine, which is entered, as shown, at block 543. Processing begins at block 666 with the selection of parts lists to be printed, after which a test is performed to determine whether the last component in the parts list has been reached, as shown at block 668. If the result at block 668 is affirmative, processing control branches back to the main menu of block 526, as illustrated by block 670, and if the result is negative, processing flow continues to block 672. At block 672, the parts list, bin location and master part information is collected, then the parts list report is printed, as shown at block 674, after which processing flow branches back to block 668, as shown.

Referring now to FIG. 7J, there is shown a generalized flow diagram illustrating the methodology and structural flow for a specific embodiment of a display list of kits subroutine, which is entered, as shown, at block 545. Processing begins with the collection of part master information for the assemblies, as illustrated by block 676, after which a sort of the collected information is performed and the result is displayed on screen, as illustrated at block 678. Program control then returns to the main menu of block 526, as illustrated at block 680.

FIG. 7K is a flow diagram illustrating the processing methodology and structural flow for a specific embodiment of a display kit currently scheduled routine, which is entered, as shown, at block 547. Processing begins at block 682, where information for kits currently scheduled is collected, then the results are displayed on screen, as illustrated by block 684, after which program control returns to the main menu of block 526, as shown at block 686.

In FIG. 7L, a flow diagram is shown illustrating the processing methodology and structural flow for a specific embodiment of a display inventory status subroutine, which is entered, as shown at block 549. Processing begins with block 688, where a request is made for selection of a part number or bin location, after which bin information and part master information is collected, as illustrated at block 690. The information is then displayed on screen, as illustrated by block 692, after which processing control returns to the main menu of block 526, as illustrated by block 694.

Referring now to FIG. 7M, there is shown a generalized flow diagram illustrating the methodology and structural flow for a specific embodiment of a cancel kit subroutine, which is entered, as shown, at block 551. Processing begins at block 696, where kits schedule information is collected and displayed on screen, after which a request is made to select a kit to cancel or to return back to the main menu, as illustrated by block 698. Processing flow then proceeds to block 700 where a test is performed to determine whether a selection has been made to return to the main menu, and if the result is affirmative, processing control returns to the main menu of block 526, as illustrated by block 702. If the result at block 700 is negative, processing flow continues to block 704, where the scheduled kit is removed and after which the remaining inventory is posted for each component, as illustrated by block 706. Processing flow then branches back to block 696, as shown.

Specific embodiments of the novel manufacturing system according to the invention have been described for the purposes of illustrating the manner in which the invention may be made and used. It should be understood that implementation of other variations and modifications of the invention in its various aspects will be apparent to those skilled in the art, and that the invention is not limited by the specific embodiments described. It is therefore contemplated to cover by the present invention any and all modifications, variations or equivalents that fall within the true spirit and scope of the basic underlying principles disclosed and claimed herein.

What is claimed is:

1. A system for assembling selected multiple component assemblies, comprising:
   (a) at least one component selection cell having a plurality of component bins, each containing a quantity of components for use in constructing selected assemblies;
   (b) numeric display means associated with each bin for display of component quantities required for the selected assembly model;
   (c) means associated with each numeric display for clearing the respective numeric display and for generating a control signal in response to clearing of all numerical displays of a cell for a selected assembly model; and
   (d) control means for controlling the numeric displays responsive to entry of a selected assembly model number and for entry of a schedule of selected assemblies to be successively assembled whereby the control means inhibits activation of the numeric displays for succeeding assemblies until the generation of the control signal.

2. The system of claim 1 wherein the control means further comprises means for maintaining an inventory of the components contained in the bins and for updating the inventory in response to the control signal.

3. The system of claim 2 wherein the control means further comprises means for determining how many of the selected assembly models can be constructed based upon the inventory.

4. The system of claim 2 wherein the control means further comprises means for providing an indication to an operator when the quantity of components falls below a preselected threshold.

5. The system of claim 2 wherein control means further comprises means for maintaining lists of parts.

6. The system of claim 5 wherein the control means further comprises means for modifying the lists of parts by substituting one part in the lists with a selected substitute part.

7. The system of claim 2 wherein the control means comprises means for providing printed reports of parts lists, inventory reports, component shortages, low stock reports and off-site material move reports.

8. The system of claim 2 wherein the control means comprises means for cancellation of a selected assembly model.

9. The system of claim 2 wherein the control means comprises means including a monitor for simulating assembly model selection without activating the display means.

10. The system of claim 1 further comprising alphanumeric display means associated with each component selection cell for displaying a selected assembly model description and wherein the control means comprises means for clearing each alphanumeric display in response to the control signal.

11. The system of claim 1 comprising a plurality of component selection cells configured in a hierarchy of at least two levels.

12. A method for assembling multiple component assemblies comprising the steps of:
   (a) automatically generating quantity numbers of parts required for construction of a selected quantity of assembly models;
   (b) automatically controlling quantity displays located in proximity to each of a plurality of parts bins containing parts to display the parts quantity number to indicate the quantity of the parts required from the bin for construction of the selected assembly models;
   (c) selecting parts from the bin in response to the displayed number for each respective bin to form kits of parts;
   (d) clearing the quantity displays after selecting the displayed number of parts from the bin;
   (e) transporting the kits of parts to a selected position on an assembly line;
   (f) assembling the parts from the kits of parts to form the desired assembly.

13. The method of claim 12 further comprising the step of displaying an assembly model identification for the selected model number.

14. The method of claim 12 wherein a plurality of separate selection cells each having a plurality of parts bins is utilized and the step of transporting comprises the steps of transporting to the cell area from which the kits of parts are transported to the assembly line.

15. The method of claim 13 further comprising the step of generating a control signal in response to clearing of all of the respective displays for the selected assembly model and automatically clearing the assembly model identification in response to the control signal.

16. A system for assembling multiple component assemblies, comprising:
   (a) at least one component selection cell having an alphanumeric display to display a selected assembly model description and having a plurality of component bins, each containing a quantity of components for use in constructing selected assemblies;
   (b) numeric display means associated with each bin for display of component quantities required for the selected assembly model;
   (c) means associated with each numeric display for clearing the respective numeric display and for generating a control signal in response to clearing of all numerical displays of a cell for a selected assembly model; and
   (d) control means for controlling the alphanumeric and numeric displays responsive to entry of a selected assembly model number and for clearing the alphanumeric display in response to the control signal.

17. The system of claim 16 wherein the control means further comprises means for maintaining an inventory of the components contained in the bins and for updating the inventory in response to the control signal.

18. The system of claim 17 wherein the control means further comprises means for determining how many of the selected assembly models can be constructed based upon the inventory.

19. The system of claim 17 wherein the control means further comprises means for providing an indication to an operator when the quantity of components falls below a preselected threshold.

20. The system of claim 17 wherein control means further comprises means for maintaining lists of parts.

21. The system of claim 20 wherein the control means further comprises means for modifying the lists of parts by substituting one part in the lists with a selected substitute part.

22. The system of claim 17 wherein the control means comprises means for providing printed reports of parts lists, inventory reports, component shortages, low stock reports and off-site material move reports.

23. The system of claim 17 wherein the control means comprises means for cancellation of a selected assembly model.

24. The system of claim 17 wherein the control means comprises means including a monitor for simulating assembly model selection without activating the display means.

25. A method for preparing multiple component assemblies for assembly comprising the steps of:
(a) automatically generating quantity numbers of parts required for construction of a selected quantity of assembly models;
(b) automatically controlling quantity displays located in proximity to each of a plurality of parts bins containing parts to display the parts quantity number to indicate the quantity of the parts required from the bin for construction of the selected assembly models;
(c) selecting parts from the bin in response to the displayed number for each respective bin to form kits of parts; and
(d) clearing the quantity displays after selecting the displayed number of parts from the bin.

26. The method of claim 25 further comprising the step of displaying an assembly model identification for the selected model.

27. The method of claim 26 further comprising the step of generating a control signal in response to clearing of all of the respective displays for the selected assembly model and automatically clearing the assembly model identification in response to the control signal.

* * * * *